United States Patent Office 3,263,435
Patented August 2, 1966

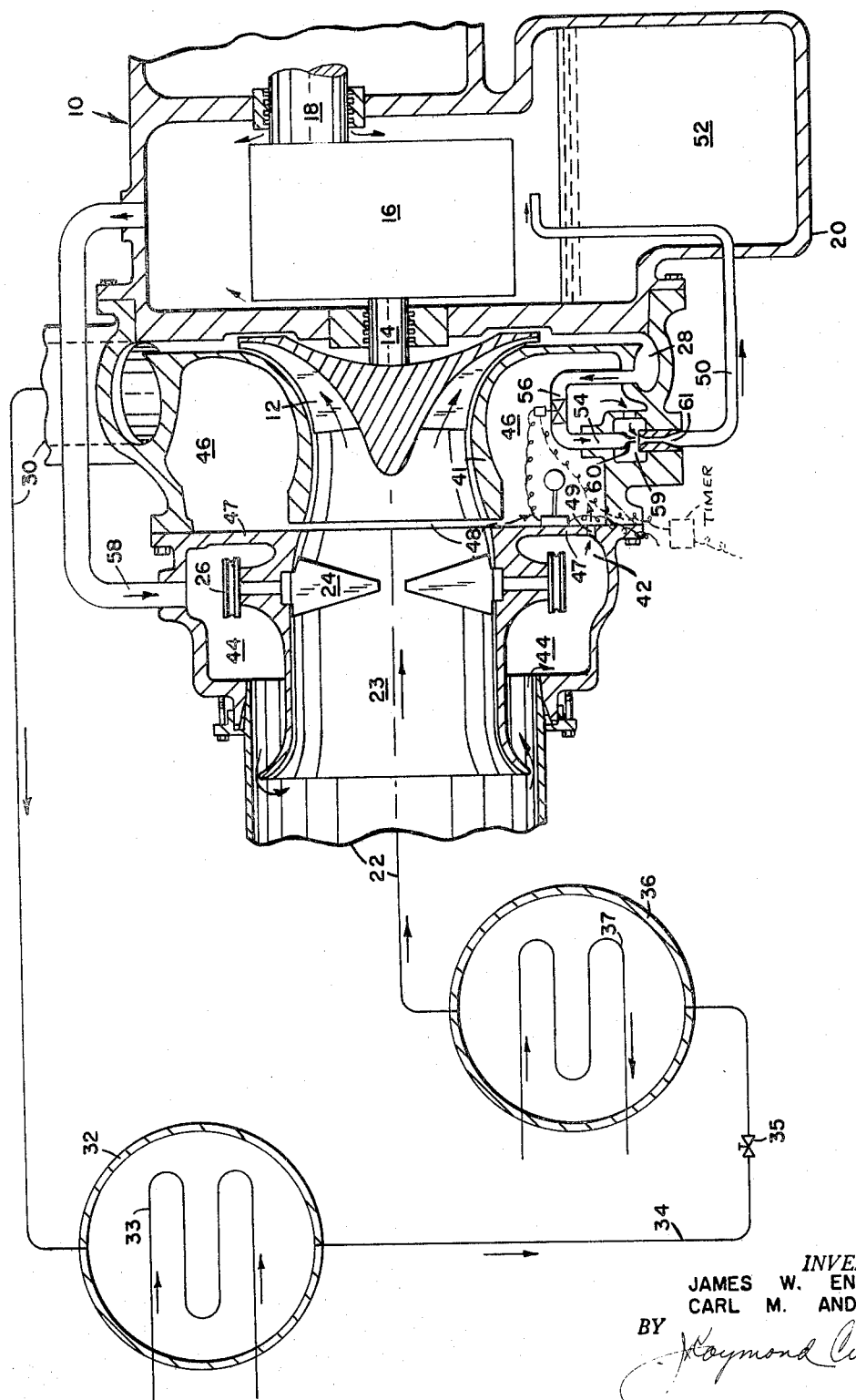

3,263,435
LUBRICANT SEPARATION AND RECOVERY SYSTEM
James W. Endress and Carl M. Anderson, Syracuse, N.Y., assignors to Carrier Corporation, Syracuse, N.Y., a corporation of Delaware
Filed Sept. 26, 1963, Ser. No. 311,874
11 Claims. (Cl. 62—84)

This invention relates broadly to lubrication systems for rotating machinery. More particularly, this invention relates to the lubrication of rotating machinery wherein the lubricant employed in the machine may, by leakage, mix with a working fluid handled by the machinery. Still more particularly, this invention relates to a lubricant separation and recovery system for use with centrifugal refrigeration machinery wherein by leakage a portion of the lubricant circulates throughout the refrigerant circuit together with the refrigerant.

In a refrigeration machine employing a gas compressor having a rotating power shaft, it is necessary that the various parts of the compression unit be lubricated in order to operate efficiently. To this end, the compression unit is provided with a sump for the purpose of accommodating lubricant. There is also provided in the machine a circuit through which the lubricant is pumped and which includes the various parts of the machine that require lubrication. In a refrigeration machine of the kind under consideration, very often portions of the lubricant escape from the circuit described and find their way into the refrigeration circuit flowing through the circuit with the refrigerant.

This invention has for its principal object an improved arrangement for recovering and separating lubricant flowing through the refrigerant flow circuit in a refrigeration machine.

An additional object of the invention is the provision of an improved method of collecting and separating lubricant from the refrigerant flow circuit for delivery to the part of the machine accommodating the lubricant for passage to the lubricant flow circuit.

In attaining the objects of this invention, use is made of the tendency of the lubricant flowing in the suction line to the inlet of the refrigerant compressor, to collect about the surface of the conduit serving as the suction line. This phenomenon may be easily observed in those machines employing a centrifugal compressor.

Another object of the invention is the provision of a lubrication collection and separation arrangement wherein the heat developed during compression of the refrigerant in the refrigerant compressor is employed for the purpose of separating refrigerant from the lubricant so that substantially pure lubricant may be transmitted to the sump or any other convenient lubricant collection point in the machine.

A still further object of the invention is an improved arrangement utilizing energy developed in the refrigerant gas stream flowing from the compressor for the purpose of transmitting separated lubricant from the refrigeration cycle to its rightful place in the lubrication cycle.

Other objects and features of the invention will be apparent upon a consideration of the ensuing specification and drawing, wherein:

The figure is a schematic representation of a centrifugal refrigeration machine equipped with the novel lubrication collection and recovery system forming the subject of this invention.

Referring to the drawing for an illustration of a preferred embodiment of the invention, it will be noted that a refrigeration machine is schematically illustrated and includes a centrifugal compression unit 10. As will be obvious to those skilled in the art, the refrigeration machine illustrated circulates a refrigerant through a refrigerant flow cycle where heat is first absorbed for the purpose of reducing the temperature of a cooling medium and then rejected in a continuous cyclical operation. In equipment of the kind described, it is necessary that there be provided proper lubrication of the centrifugal compressor unit 10. To this end, the unit 10 is provided with a charge of lubricant and a pump, not shown, together with a circuit for continuously circulating lubricant to the parts of the compressor requiring lubrication. During operation of the equipment described, very often a small portion of the lubricant escapes from the lubrication circuit and flows into the portion of the machine through which the refrigerant flows. This may occur through the labyrinth type seals employed with the equipment, vent lines in the form of vapor or fine droplets, or if there is a defective gasket or other type sealing device in the machine, small portions of the lubricant may also escape. It will be obvious that over an extended period of time there may occur a depletion in the lubricant charge sufficiently great to render the machine inoperative due to low oil pressure. The lubricant escaping into the refrigerant cycle does so in relatively small quantities. It is carried through the cycle and may collect in a portion of the machine such as the heat transfer coils where it may reduce substantially the capacity of the equipment. It is also possible that the escaping lubricant would find its way into the purge unit employed with machinery of this type and be vented to the atmosphere. The lubricant in finely divided droplets is carried by the gaseous refrigerant in the suction and discharge lines of the machine and is carried by the liquid refrigerant in the parts of the refrigerant cycle wherein the refrigerant is found in the liquid phase.

This invention is directed to an arrangement for collecting lubricant that finds its way into the refrigerant cycle, separating the lubricant from any liquid refrigerant that it might have flowing with it when collected, and transmitting the lubricant back to the portion of the compressor accommodating lubricant for flow in the lubrication circuit.

The machine illustrated includes an impeller 12 mounted on a driven shaft 14 connected by a transmission unit 16 to driver shaft 18. All of the elements described are arranged within a casing 20 serving as a housing for the motor compressor unit. It will be appreciated that an electric motor, not shown, is employed for the purpose of operating driver shaft 18.

As a part of the refrigeration machine, there is provided a suction line 22 connected to the casing of the motor compressor unit through a suction gas inlet conduit 23, in which guide vanes 24 are mounted for the purpose of regulating the capacity of the machine. Operation of guide vanes 24 is controlled by actuating mechanism 26. Refrigerant gas flowing in suction line 22 enters the impeller where it is compressed and discharged to the volute 28 formed as a part of casing 20, communicating with the discharge line 30, which in turn connects to condenser 32. The gaseous refrigerant is converted to the liquid phase in the condenser as the heat of condensation is rejected to the cooling medium flowing in coil 33. Liquid refrigerant formed in condenser 32 flows through a liquid line 34, expansion valve 35 to an evaporator or cooler 36. In the evaporator there is provided a coil 37 through which a medium to be cooled flows. Passage of heat from the medium to the refrigerant in the evaporator causes vaporization of the refrigerant, which then flows under the influence of the impeller through suction line 22 to complete the refrigerant flow cycle.

Referring more particularly to the casing 20, it will be observed that casing wall 41 serves as a part of the diffuser employed with the impeller 12 for the purpose of converting the velocity energy in the gas stream to pressure. The motor compressor casing 20 is constructed so as to form a compartment 42, divided into compartment sections 44 and 46 by intermediate wall 47 serving as a part of suction gas inlet conduit 23. A space 48 is provided between the suction gas inlet 23 and the wall 41 for a purpose to be later explained. There is also an opening 49 in the intermediate wall 47.

For the purpose of transferring lubricant that may collect in compartment 42 there is provided a line 50 connecting the compartment with the section of the motor compressor unit accommodating the oil reservoir, commonly referred to as a sump 52. Assisting in the transmission of lubricant from compartment 42 in a manner to be later explained as jet pump 54 connected to the volute 28 by conduit 56. In addition, there is a vent line 58 connecting the interior of the casing with the suction line, as indicated by the arrows disposed therein.

Considering the operation of the invention, it has been discovered that refrigerant gas flowing in the suction line has carried as a mist or finely divided spray, small portions of lubricant-refrigerant mixture. As the gas in the suction line 22 nears the impeller, it is provided with a swirling action which creates a centrifuge-like action, causing deposition of the liquid constituent in the gas stream along the walls of the suction line and suction inlet member 23. The guide vanes 24, because they are disposed at an angle to the direction of gas flow, promote this centrifuge-like action as the gas enters the impeller. This invention provides a compartment 42 having communication with the refrigerant gas stream through the space 48, which serves to promote drainage of the liquid clinging to the walls of members 22 and 23 of the machine to the compartment section 46. Entrance to the compartment section 46 occurs through space 48, while entrance to the section 44 may occur through a clearance between the inlet 23 and conduit 22. The liquid flowing in compartment section 44 may enter compartment section 46 through the opening 49 in the intermediate wall 47.

As pointed out above, the liquid collected in compartment 42 not only includes lubricant but small portions of liquid refrigerant carried in finely divided form from the evaporator to the compressor. Inasmuch as a part of the compartment 42 is formed by wall 41, it will be appreciated that there is provided a source of heat for the purpose of vaporizing the liquid refrigerant in the liquid mixture present in compartment section 46. Casing wall 41 is at a relatively high temperature because of the hot compressed gas flowing in the diffuser, of which casing wall 41 is a part.

The refrigerant vaporized in compartment 42 may re-enter the suction line through space 48 promoting drainage from the line. The liquid remaining in compartment 46 is now substantially pure lubricant and it collects at the bottom of the compartment in well 59 at which point it is pumped by the ejector or jet pump 54 to conduit 50 having communication with the lubrication sump. The jet pump receives a portion of the hot gas discharged through conduit 56 connecting the ejector with the hot gas in the volute 28. The ejector, it will be appreciated, includes a nozzle 60 and a venturi section 61 through which the lubricant is induced to flow by the action of the high pressure gas leaving the nozzle.

While the pump action, as illustrated, is continuous, it may be desirable if the action of the pump were intermittent. To this end, an electrically operated valve member may be incorporated in line 56 and be responsive to a timer or a float measuring the level of lubricant in the compartment. The valve would then regulate operation of the ejector by intermittently interrupting and establishing communication between the nozzle and the source of high pressure discharge gas to which line 56 is connected.

From the above description, it will be appreciated that there is provided an arrangement for receiving liquid carried to the compressor by the suction gas. In addition, there is provided an arrangement for separating that portion of the liquid that may be unvaporized refrigerant, and further, there is provided a pumping action for purging the compartment of the purified lubricant wherein the pump utilizes energy present in the refrigerant cycle for this purpose.

It will be appreciated that lubricant which has collected in compartment 59 may contain solid metallic particles which may be harmful if deposited in the lubrication sump. For this reason, it may be desirable to pass the lubricant through a filter before entering the jet pump 54. It also may be desirable to install this system externally in place of built in, as shown in the illustration.

While we have described a preferred embodiment of the invention, it will be understood the invention is not limited thereto since it may be otherwise embodied within the scope of the following claims.

We claim:

1. In a refrigeration machine including a compressor having a lubrication circuit and an impeller for circulating refrigerant together with portions of the lubricant charge that may leak into the refrigerant flow path through said machine, a suction line connected to said compressor, guide vanes disposed in said suction line upstream of said compressor for regulating capacity of the machine, and means forming a casing for housing said compressor, a lubricant separation and recovery system comprising:

(a) means forming a compartment in said casing, said compartment having limited communication with the suction line so that unvaporized liquid refrigerant and small quantities of lubricant, carried by the suction gas and deposited on the surface of the suction line by centrifugal forces developed in the gas stream as it enters the compressor under the influence of the impeller, may drain into said compartment, said compartment forming means including a wall common to the discharge of the relatively high temperature gas from the impeller, (b) an ejector disposed within said compartment, and (c) conduit means connecting the ejector with the high pressure refrigerant flowing from the compressor to provide a source of energy to the ejector to induce flow of liquid from said compartment to said lubricant circuit.

2. In a refrigeration machine including a compressor having a lubrication system characterized by a circuit for the flow of lubricant from which circuit lubricant may escape and mix with refrigerant flowing through said machine, (a) means having communication with surfaces of the machine upon which lubricant and refrigerant may collect for receiving a lubricant-refrigerant mixture flowing in the refrigerant flow path in the machine, (b) means for elevating the temperature of the collected mixture to vaporize that portion of the mixture composed of refrigerant, and (c) means including an ejector having communication with high pressure gaseous refrigerant flowing from said compressor for transmitting the remainder of the mixture to the lubricant flow circuit.

3. The invention set forth in claim 2 wherein said lubricant-refrigerant mixture receiving means includes a wall forming a part of the path of flow of refrigerant from the compressor.

4. In a refrigeration machine including a compressor having a lubrication system characterized by a circuit for the flow of lubricant from which circuit lubricant may escape and mix with refrigerant flowing through said machine, (a) means forming a compartment for receiving a mixture of lubricant and refrigerant in fluid form, said means including a wall defining a part of the path of flow of the high temperature gaseous refrigerant discharged from the compressor so that the temperature of the mixture is elevated vaporizing the refrigerant from the mixture, and (b) forwarding means utilizing a portion of the compressor discharge gas to transmit the lubricant flow circuit.

5. A refrigerant machine comprising a centrifugal compressor having an impeller, a diffuser through which refrigerant gas flowing from the compressor passes and a lubrication system including a sump for the accommodation of lubricant in the machine; an evaporator; conduit means connecting the compressor and the evaporator, said conduit means including a surface upon which a mixture of refrigerant and lubricant is deposited by the action of the gaseous refrigerant flowing under the influence of the compressor impeller, means including a portion of t the diffuser forming a compartment having communication with the said conduit surface for accumulating a refrigant-lubricant mixture draining from said surface, the refrigerant gas flowing in the diffuser elevating the temperature of the mixture to evaporate the refrigerant in said mixture and means for transmitting the lubricant substantially free of the refrigerant from the compartment to the sump.

6. A refrigeration machine as described in claim 5 wherein said lubricant transmitting means includes an ejector and a line connecting the ejector to the discharge gas flowing from said compressor.

7. A refrigeration machine as described in claim 6 wherein intermittently operated valve means control flow in the line connecting the ejector and the flow of discharge gas from the compressor.

8. The method of separating lubricant from a lubricant-refrigerant mixture flowing in a refrigeration machine having a compressor communicating with an evaporator and a lubrication system comprising:

(a) imparting a rotary motion to the fluid flowing from the evaporator to the compressor so as to deposit by centrifugal action any liquid component of the fluid flowing to the compressor;

(b) collecting the deposited fluid for flow to a collection area;

(c) applying heat to the collected mixture to vaporize the refrigerant constituent; and (d) utilizing a portion of the discharge gas to transmit the residue to the sump of the machine for introduction into the lubrication system.

9. The method set forth in claim 8 wherein the heat for vaporizing the refrigerant constituent is supplied by the hot discharge gaseous refrigerant flowing from the compressor.

10. The method set forth in claim 8 wherein the energy employed to transmit the residue is obtained by utilizing a portion of the discharge gas flowing from the compressor.

11. The method of separating lubricant from a lubricant-refrigerant mixture flowing in a refrigeration machine having a lubrication system comprising:

(a) collecting the liquid lubricant-refrigerant mixture circulating within the machine;

(b) applying heat available within the machine, as the gaseous refrigerant is compressed in the compressor, to the collected mixture, to vaporize the refrigerant constituent; and (c) utilizing a portion of the discharge gas flowing from the compressor to transmit the liquid residue to the lubrication system.

References Cited by the Examiner

UNITED STATES PATENTS

| 2,012,209 | 8/1935 | Williams | 62—84 |
| 2,048,025 | 7/1936 | Philipp | 62—471 |
| 2,121,253 | 6/1938 | McGuffey | 62—471 X |
| 3,004,396 | 10/1961 | Endress et al. | 62—194 X |
| 3,073,515 | 1/1963 | Neubauer et al. | 62—469 X |

ROBERT A. O'LEARY, *Primary Examiner.*

W. E. WAYNER, *Assistant Examiner.*